July 25, 1950

O. R. DECKERT 2,516,621

MEAT TENDERING MACHINE

Filed Dec. 20, 1948

3 Sheets-Sheet 1

Inventor:
O. Robert Deckert,
by Thomas H. Hamilton
Attorney

July 25, 1950 O. R. DECKERT 2,516,621
MEAT TENDERING MACHINE
Filed Dec. 20, 1948 3 Sheets-Sheet 2

Inventor:
O. Robert Deckert,
by *Munro H. Hamilton*
Attorney

July 25, 1950            O. R. DECKERT            2,516,621
MEAT TENDERING MACHINE
Filed Dec. 20, 1948            3 Sheets-Sheet 3
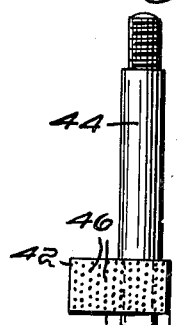
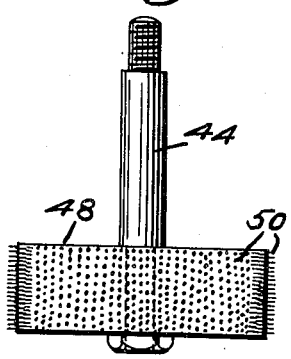
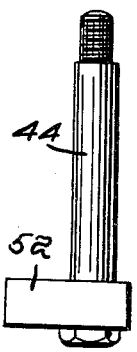
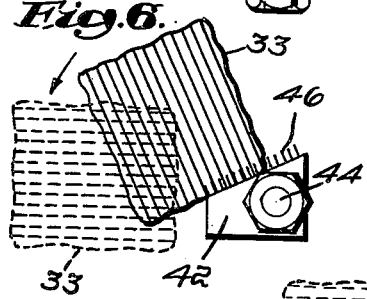
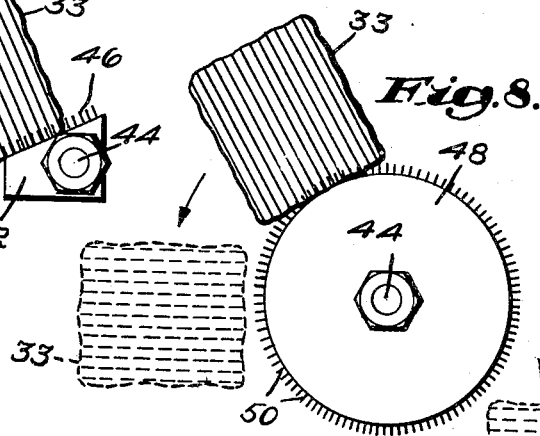
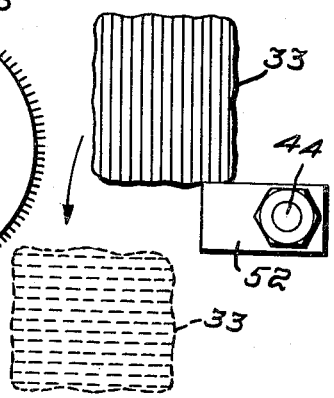
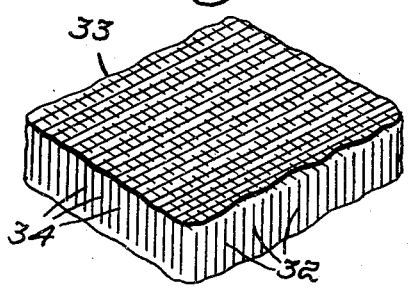
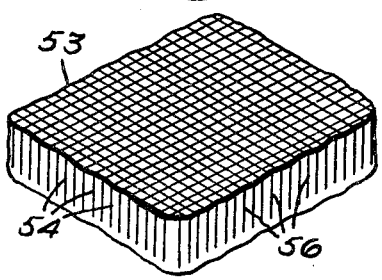
Inventor:
O. Robert Deckert,
by Munroe H. Hamilton
Attorney Patented July 25, 1950

2,516,621

UNITED STATES PATENT OFFICE 2,516,621

MEAT TENDERING MACHINE

Oscar Robert Deckert, Newtonville, Mass.

Application December 20, 1948, Serial No. 66,349

11 Claims. (Cl. 17—26)

This invention relates to meat tendering machines and more particularly to a machine for tender-cutting into one or both faces of the meat and in relatively angular directions through the meat. The meat can be cut in one direction at one face and in a relatively angular direction at the other face or it can be cut in relatively angular directions at either or both faces.

Meat tendering machines in present use employ a pair of cooperating gang cutters which cut the meat in one direction at either or both faces as the meat is passed therethrough. When the meat is also to be cut in a relatively angular direction it must be passed through the machine a second time and in a relatively angular direction. The primary object of my invention resides in the provision of a meat tendering apparatus adapted to tender-cut the meat at both faces in relatively angular directions at one passage through the machine.

My improved machine embodies upper and lower tendering knives and means disposed therebetween for rotating the meat approximately one-quarter of a turn during its passage from the upper to the lower knives. The turning means which I preferably employ embodies a light weight and freely rotatable wheel provided with a peripheral portion adapted to receive pieces of meat from and which have been cut in one direction by the upper knives and rotate the meat approximately a quarter turn so that it is cut in a relatively angular direction as it passes through the lower knives. The two sets of knives can be superposed in a single frame and driven by a single motor or two meat tendering machines can be superposed and together with the meat turning means perform the tender-cutting operation in relatively angular directions during a single passage of the meat therethrough. The production of a machine embodying these novel features comprises a further object of the invention.

Figure 1:
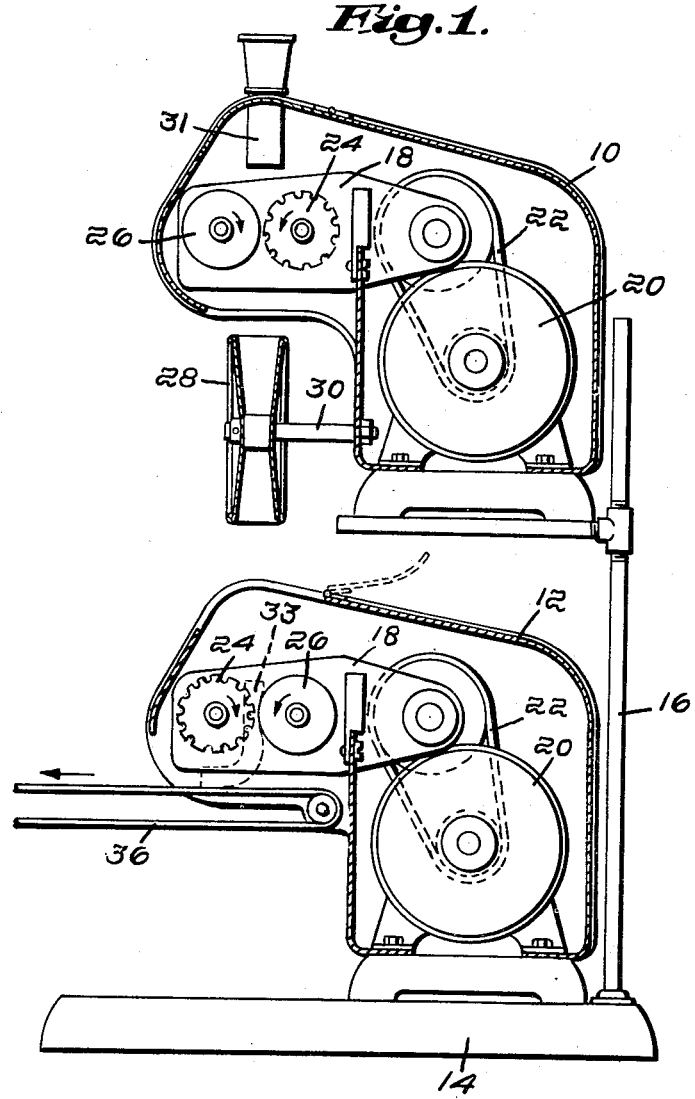
Figure 2:
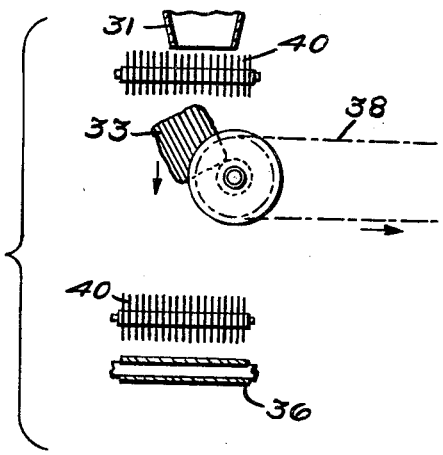
Figure 3:
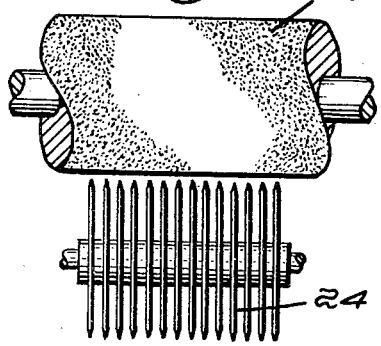
Figure 4:
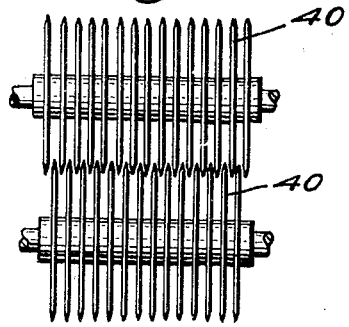

These and other features of the invention will be best understood and appreciated from the following description of preferred embodiments thereof selected for purposes of illustration and shown in the accompanying drawings in which:

Fig. 1 is an end elevation, partially in section, of a machine embodying my invention, Fig. 2 is a front elevation of the meat cutting and turning elements of the machine, Fig. 3 is a fragmentary plan view of the meat receiving and cutting rolls, Fig. 4 is a like view of a modified pair of cutting rolls, Fig. 5 is a plan view of a modified bracket abutment for turning the meat, Fig. 6 is a front elevation thereof, Fig. 7 is a plan view of a further modified construction, Fig. 8 is a front elevation thereof, Fig. 9 is a plan view of another form of abutment, Fig. 10 is a front elevation thereof, Fig. 11 is a fragmentary view of a piece of meat cut at both faces by the machine shown in Fig. 1, and Fig. 12 is a like view of a piece of meat cut at one face.

My invention contemplates two sets of meat treating rolls in spaced relation vertically and means disposed between the two sets for receiving the meat from the first set and turning it approximately one-quarter turn as it falls to the second set. In Fig. 1 I have illustrated two meat tendering machines 10 and 12 supported in superposed relation on a base 14 and frame 16. Each machine embodies a pair of cooperating rolls driven in the directions indicated by gearing in a gear box 18 from a motor 20 through a belt 22. Each pair of rolls illustrated in Fig. 1 comprises a gang of disk cutters 24 and a cooperating roll 26 for supporting the meat relative to the cutters. The machine shown in Fig. 1 is adapted to cut the meat from opposite faces and the upper and lower gang cutters 24 are therefore disposed at opposite sides of the path of meat for this purpose.

Disposed beneath the upper pair of rolls is a light weight wheel 28 embodying two light weight disks on a hub. The hub is mounted for free rotation on a shank 30 supported by and extending forwardly from the upper machine 10. The meat 33 is passed downwardly through a chute 31 disposed above the upper pair of rolls and in a position slightly forward of the axis of rotation of the wheel 28. As the meat drops from the upper rolls onto the wheel it tips forwardly by gravity in its own plane and is rotated approximately one-quarter turn as it falls to the lower pair of rolls.

As the meat passes through the upper pair of rolls it is cut at 32 at one face by the upper gang cutters 24. As the meat passes through the lower pair of rolls it is cut at 34 at the other face by the lower gang cutters 24. The wheel 28 is so light as to have very little inertia thus moving quickly under the weight of the meat. If desired the wheel can be driven as by a belt indicated in broken lines at 38 in Fig. 2.

An endless conveyor 36 is disposed beneath and transversely of the lower cutting rolls 24 and 26 and has a top reach positioned to receive meat from the lower rolls and convey it to a predetermined point. It will be apparent that the positioning of the conveyor transversely of the rolls permits the moving top reach flatly to receive the meat as it comes from such rolls. The conveyor is preferably located sufficiently close to the rolls to receive the meat while it is held by and emerging from the rolls, thus gently laying the meat out flatly on the conveyor and preventing its disarrangement.

If it is desired to cut the meat at both faces at both sets of rolls, each pair of rolls will comprise two cooperating gangs of cutters 40 as indicated in Fig. 4.

The meat turning means can be embodied in various forms. In Figs. 5 and 6 I have illustrated an abutment 42 mounted on a stud 44 and provided with upwardly extending pins 46 for engaging the meat and from which the meat is adapted to tip as it falls from the upper cutters. In Figs. 7 and 8 I have illustrated a freely rotatable roll 48 provided with pins 50 on its periphery. In Figs. 9 and 10 I have illustrated a plane abutment 52 adapted to engage one corner of the meat and effect the turning function.

The piece of meat 33 shown in Fig. 11 has been cut at both faces in relatively right angular directions. If it is desired to cut the meat in relatively angular directions at one face, both upper and lower gang cutters 24 will be located at the same side of the path of meat through the machine. A piece of meat 53 which has been thus cut at 54 and 56 is shown in Fig. 12.

Having thus disclosed my invention what I claim as new and desire to secure by Letters Patent is:

1. A meat tendering machine comprising a pair of cooperating rolls including a gang of cutters on one roll, a similar pair of cooperating rolls beneath and parallel with the first pair, and a member disposed between the two pairs of rolls in position to intercept a piece of meat from the first pair and cooperate therewith and with gravity action on the meat to turn it within a plane parallel with the rolls and to such position that it passes through the second rolls in a direction angular to its passage through the first rolls.

2. The machine defined in claim 1 in which one pair of rolls includes a gang of cutters for engaging and cutting into one side of the piece of meat and the other pair includes a gang of cutters for engaging and cutting into the other side thereof.

3. The machine defined in claim 1 in which said member comprises a fixed abutment having a meat engaging surface for receiving and supporting the meat off balance thereon adjacent to one marginal edge and from which surface the meat is adapted to turn by gravity as it drops to the second rolls.

4. The machine defined in claim 1 plus a meat receiving and guiding chute above the first rolls and arranged in a position above said member to guide meat downwardly in a path to contact said member in predetermined relative position.

5. The machine defined in claim 1 plus an endless conveyor disposed beneath and transversely of said second rolls and having a top reach positioned to receive meat from the second rolls and convey it to a predetermined point.

6. A meat tendering machine comprising a pair of cooperating rolls including a gang of cutters on one roll, a similar pair of cooperating rolls beneath and parallel with the first pair, and a pivotally mounted member between the two pairs of rolls for receiving a piece of meat from the first pair and turn it within a plane parallel with the rolls as it falls to the second pair of rolls.

7. The machine defined in claim 6 in which said pivotally mounted member comprises a wheel rotatable on an axis disposed transversely of a plane passing between the cooperating rolls of both pairs.

8. The machine defined in claim 7 in which said wheel has an annular peripheral portion adapted to receive said meat above said axis and turn the meat with the wheel about the axis.

9. The machine defined in claim 8 in which the wheel is mounted for free rotation and is disposed to receive said meat at one side of said axis, said meat being adapted to rotate the wheel by gravity.

10. The machine defined in claim 6 in which said pivotally mounted member comprises a wheel rotatable on an axis disposed transversely of a plane passing between the cooperating rolls of both pairs, and means for rotating the wheel in a direction to carry meat dropped thereonto from the first pair of rolls, and deliver it to the second pair of rolls, rotation of the wheel being adapted to turn the meat therewith about said axis.

11. A meat tendering apparatus comprising two meat tendering machines each having a pair of cooperating rolls including a gang of cutters on one roll, means for supporting said machines in superposed relation with the pairs of rolls disposed one above and parallel with the other, and a member disposed between the two pairs of rolls for receiving a piece of meat from the upper pair and turning it within a plane parallel with the rolls as it falls to the lower pair of rolls.

OSCAR ROBERT DECKERT.

REFERENCES CITED

The following references are of record in the file of this patent:

UNITED STATES PATENTS

| Number | Name | Date |
|---|---|---|
| 880,589 | Snelling | Mar. 3, 1908 |
| 2,013,504 | Poeppel | Sept. 3, 1935 |
| 2,171,900 | Spang | Sept. 5, 1939 |